United States Patent
Hall et al.

(10) Patent No.: US 9,153,247 B1
(45) Date of Patent: Oct. 6, 2015

(54) FAR FIELD INTERFERENCE MITIGATION BY RELATIVE FREQUENCY ORDERING

(71) Applicant: HGST Netherlands B.V., Amsterdam (NL)

(72) Inventors: David Robison Hall, Rochester, MN (US); Ali Sam Khalili, Byron, MN (US)

(73) Assignee: HGST NETHERLANDS B.V., Amsterdam (NL)

( * ) Notice: Subject to any disclaimer, the term of this patent is extended or adjusted under 35 U.S.C. 154(b) by 0 days.

(21) Appl. No.: 14/601,588

(22) Filed: Jan. 21, 2015

(51) Int. Cl.
*G11B 27/36* (2006.01)
*G11B 5/012* (2006.01)

(52) U.S. Cl.
CPC ..................... *G11B 5/012* (2013.01)

(58) Field of Classification Search
CPC ...... B11B 5/012; G11B 27/36; G11B 19/045; G11B 20/879; G11B 2220/20; G11B 5/02; G11B 5/00
USPC ................. 360/31, 55, 75, 72.1, 48; 711/165
See application file for complete search history.

(56) References Cited

U.S. PATENT DOCUMENTS

| | | | |
|---|---|---|---|
| 8,120,866 B2 | 2/2012 | Che et al. | |
| 8,331,053 B2 | 12/2012 | Hobbet | |
| 8,531,793 B2 | 9/2013 | Bandic et al. | |
| 8,879,181 B2 * | 11/2014 | Toda et al. | 360/31 |
| 2008/0174905 A1 | 7/2008 | Ueda | |
| 2009/0244775 A1 | 10/2009 | Ehrlich | |
| 2013/0185498 A1 | 7/2013 | Islam et al. | |
| 2014/0016224 A1 | 1/2014 | Unoki et al. | |

* cited by examiner

*Primary Examiner* — Nabil Hindi

(57) ABSTRACT

A method is disclosed for improved operation of a data storage device such as a hard disk drive, wherein the overhead for data rewriting is reduced or eliminated by the grouping of logical zones in proximity to other zones with similar writing frequencies. Thus cold zones are written near other cold zones, and hot zones near other hot zones, within a multiplicity of realms on the data storage surface. Substantial reductions in FTI writes are achievable in comparison with previous FTI mitigation algorithms.

12 Claims, 11 Drawing Sheets

FAR FIELD INTERFERENCE MITIGATION BY RELATIVE FREQUENCY ORDERING

TECHNICAL FIELD

The present invention relates to data storage devices and in particular to data storage devices having physical data storage locations in close proximity which may have widely differing writing frequencies.

BACKGROUND

Data storage devices employ rotating data storage media such as hard disk drives. In a hard drive, data is written to the disk medium using a write head which generates a high localized magnetic field which aligns magnetic domains within the disk in one of two directions. In some cases, the magnetization direction is up or down relative to the plane of the disk (perpendicular magnetic recording, or PMR). In other cases, the magnetization direction is within the plane of the disk. In all cases, this data may then be read-out with a read head. The write and read heads are typically integrated within a single assembly. To achieve steadily increasing data storage densities (typically measured in bits/inch$^2$), which are now achieving levels near $10^{12}$ bits/in$^2$, the sizes of magnetic regions storing individual bits have been reduced to nm levels.

To achieve these increasing data storage densities, the dimensions (widths) of data tracks are being steadily decreased and the track-to-track spacings also reduced correspondingly, with the result that magnetic interference effects between neighboring tracks (adjacent track interference, ATI), and nearby tracks (far track interference, FTI) are becoming an increasing problem for the maintenance of data integrity. One current solution to this problem is to monitor the total number of writes on any given track and in idle time (i.e., in periods during which the host computer is not transmitting read or write commands to the HDD), execute a background media scan. During this background media scan, lower levels for correction (i.e., fewer error-correction code bits) are used—if the track can still be read but is compromised, it is refreshed (i.e., the same data is rewritten into that same physical location on the disk medium). The time required for these data readout and rewriting operations may affect the overall performance of the HDD and is undesirable.

Thus it would be advantageous in a data storage system to provide a method for improved control of far track interference (FTI) and adjacent track interference (ATI) effects with reduced overhead on HDD operation, thereby improving the overall performance of the HDD.

It would also be advantageous to provide a method for rewriting zones closer to other zones with similar writing frequencies: cold zones near other cold zones, and hot zones near other hot zones, thereby reducing the need for FTI rewrites in both the cold and hot zones.

SUMMARY

Some embodiments of the present invention provide methods for improved data storage (reading and writing) in a hard disk drive or other data storage device having data storage locations in close proximity to each other and with widely differing rates of data writing. The close proximity of these storage locations may induce magnetic interference effects (adjacent track interference, ATI, or far track interference, FTI), causing reductions in the magnetization of data bits, and consequently a need to use more error correction code bits during data readout. When increased numbers of error bits are required, the data decoding algorithm will be slower, leading to a reduction in HDD readout performance.

A goal of some embodiments is to provide a method for improved control of far track interference (FTI) and adjacent track interference (ATI) effects with reduced overhead on HDD operation, thereby improving the overall performance of the HDD.

A further goal of some embodiments is to provide a method for rewriting zones closer to other zones having similar writing rates. Thus "cold" zones would be rewritten near other "cold" zones, and "hot" zones would be rewritten near other "hot" zones.

DETAILED DESCRIPTION

Embodiments can provide one or more advantages over previous methods for reducing the loss of data due to far track interference (FTI). Benefits may also be utilized to reduce the effects of adjacent track interference (ATI). Not all embodiments may provide all the benefits. The embodiments will be described with respect to these benefits, but these embodiments are not intended to be limiting. Various modifications, alternatives, and equivalents fall within the spirit and scope of the embodiments herein and as defined in the claims.

Data Storage System

Figure 1:
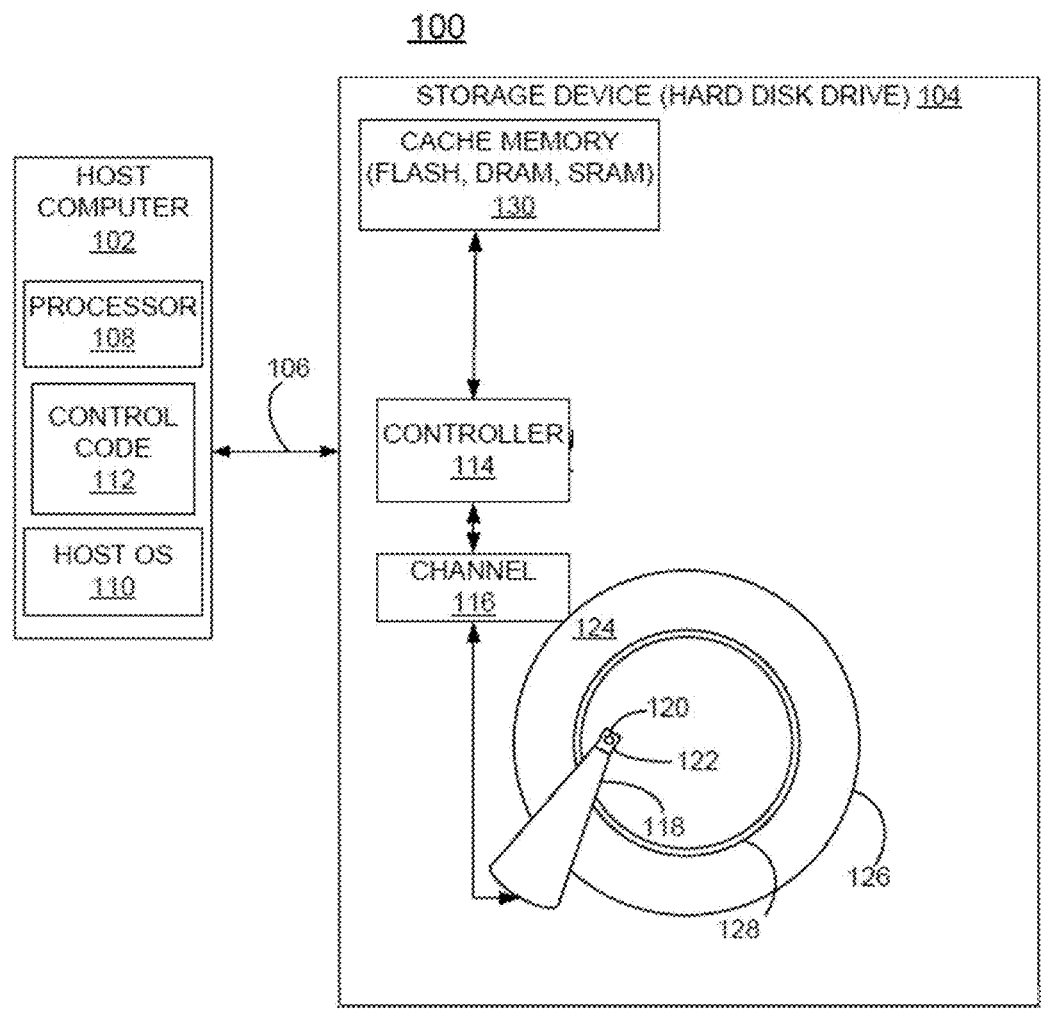
FIG. 1 is a schematic diagram of an embodiment of a data storage system.

FIG. 1 is a schematic diagram of an embodiment of a data storage system 100. System 100 includes a host computer 102, a storage device 104, such as a hard disk drive (HDD), and an interface 106 between the host computer 102 and the storage device 104. Host computer 102 includes a processor 108, a host operating system (OS) 110, and control code 112. The storage device or HDD 104 includes controller 114 coupled to a data channel 116. The storage device 104 includes an arm 118 carrying a read/write head including a read element 120 and a write element 122.

In operation, host operating system 110 in host computer 102 sends commands to storage device 104. In response to these commands, storage device 104 performs requested functions such as reading, writing, and erasing data, on disk surface 124. Controller 114 causes write element 122 to record magnetic patterns of data on a writable surface of disk 124 in tracks 128. The controller 114 positions the read head 120 and write head 122 over the recordable or writable surface 124 of disk 126 by locking a servo loop to predetermined servo positioning burst patterns, typically located in servo spokes or zones. The predetermined servo positioning pattern may include a preamble field, a servo sync-mark (SSM) field, a track/sector identification (ID) field, a plurality of position error signal (PES) fields, and a plurality of repeatable run out (RRO) fields following the burst fields. In accordance with some embodiments of the invention, system 100 includes a cache memory 130, for example, implemented with one or more of: a flash memory, a dynamic random access memory (DRAM), or a static random access memory (SRAM).

System 100 including the host computer 102 and the storage device or HDD 104 is shown in simplified form sufficient for understanding. The illustrated host computer 102 together with the storage device or hard disk drive 104 is not intended to imply architectural or functional limitations. This version may be used with various hardware implementations and systems and various other internal hardware devices.

Segmentation of the Disk Storage Medium into Realms

Figure 2:
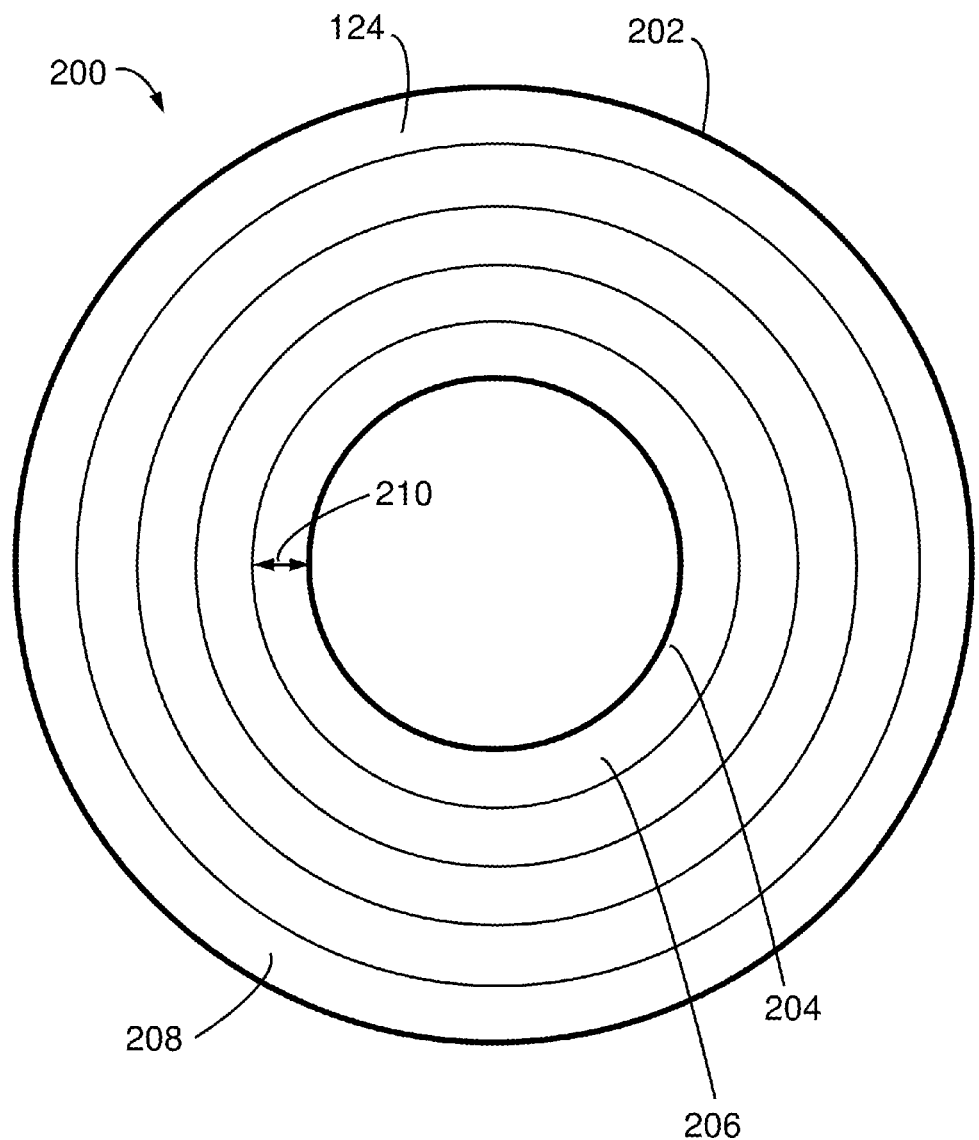
FIG. 2 is a schematic diagram of the surface of a disk storage medium, illustrating radial segmentation into realms.

FIG. 2 is a schematic diagram 200 of the surface 124 of a disk storage medium, illustrating segmentation into realms. The disk medium has an inner diameter 204 and an outer diameter 202. Between the inner and outer diameters, a series of concentric rings define a multiplicity of realms on the surface 124, ranging from inner realm 206 to outer realm 208. Each realm has a radial dimension 210, where typically dimension 210 may vary from the ID to the OD to maintain approximately equal writing rates. In other embodiments the radial dimension 210 may be constant for all realms from the ID to the OD. Where the number of realms may typically be approximately 20. In a typical disk storage device, there may be multiple platters, and each realm comprises all the tracks in the rings at approximately the same radius on each platter.

Required Data Structures for Embodiments

For some embodiments, a number of arrays or data structures may be utilized, as illustrated in FIGS. 3-9 below. Each of these arrays, and the indirection system mapping, apply within an individual realm—all of the array definitions and zone writing RFO operations of methods may be conducted within single realms, thus there are separate RFO arrays, reverse RFO arrays, frequency neighborhood arrays, indirection system mappings, and spare zone arrays for each realm.

Figure 4:
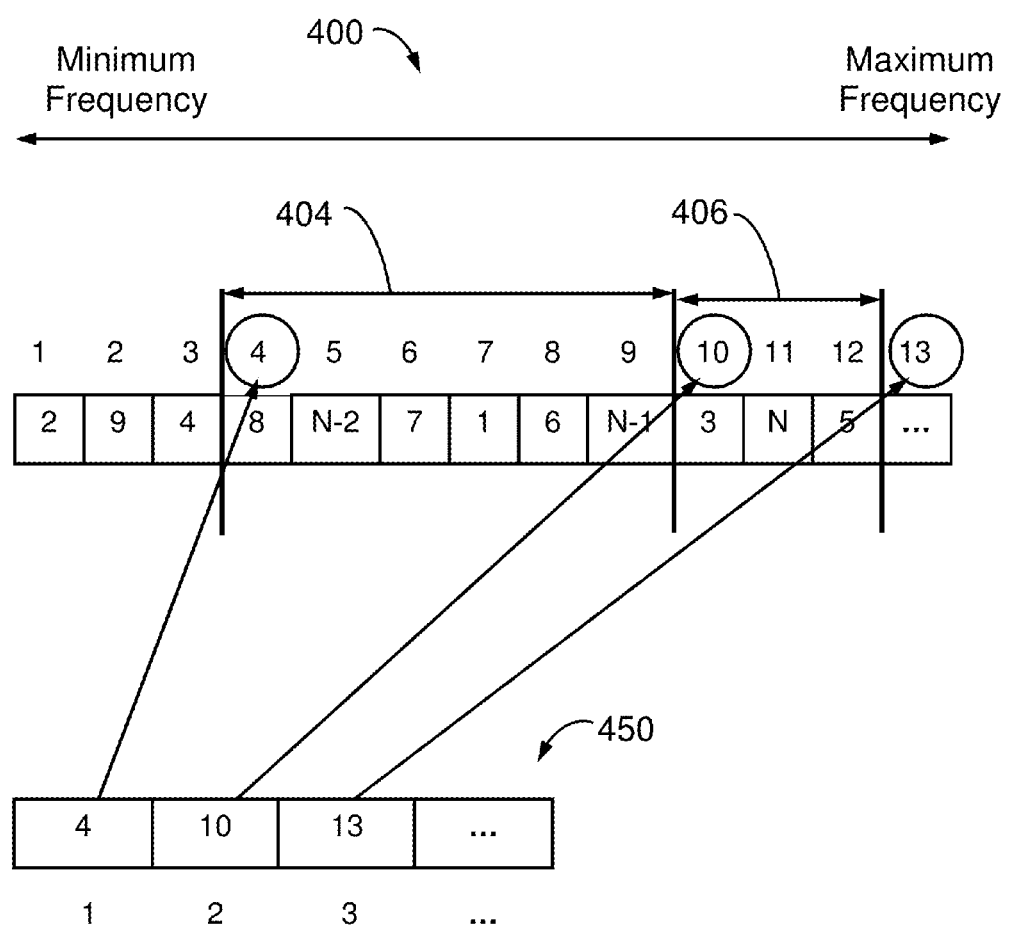
FIG. 4 is a schematic diagram of a RFO array and a frequency neighborhood array.

Relative Frequency Ordering (RFO) Array—this array has elements corresponding to the numeric label of each zone within the realm, typically 2000 zones/realm, with corresponding index numbers ordered from the minimum writing frequency up to the maximum writing frequency, where there may typically be 20 realms as illustrated in FIG. 2. Each element in this array represents a logical zone within a realm—two bytes may be allocated to store each zone address, potentially enabling the use of up to $2^{16}-1=65535$ zones. Array 400 in FIG. 4 is an example of an RFO array.

Figure 5:
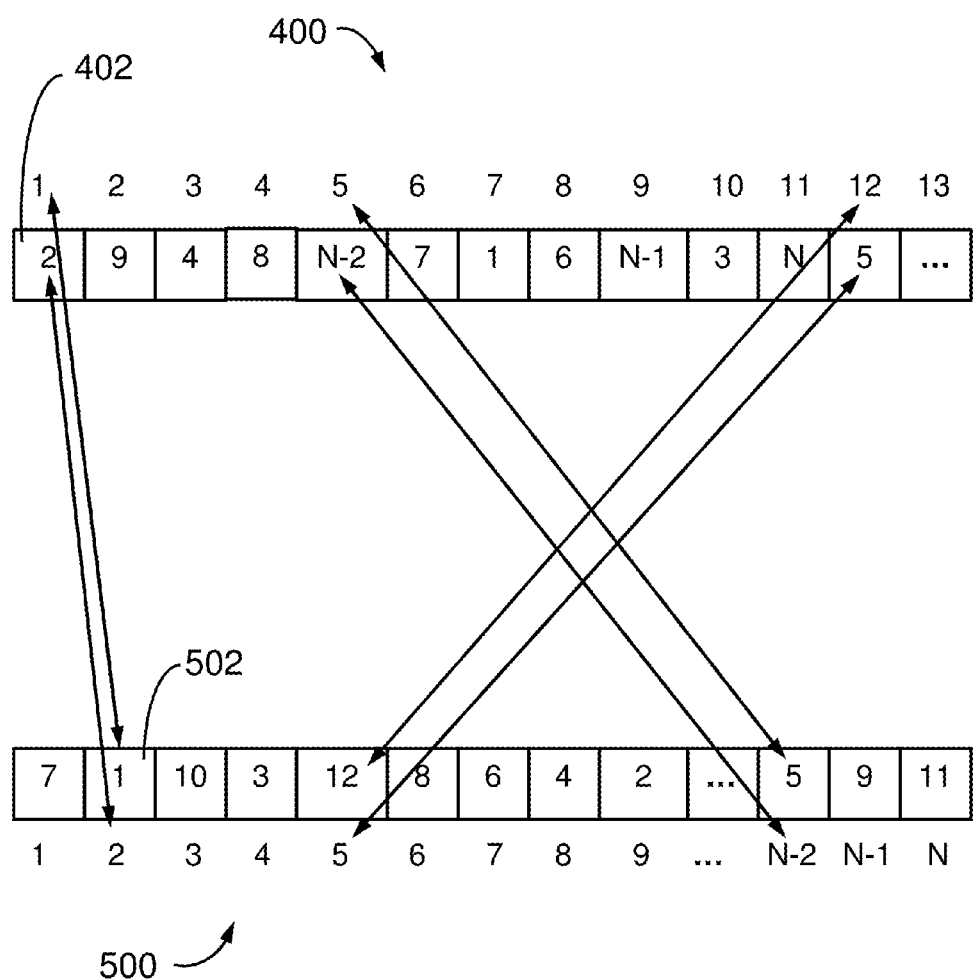
FIG. 5 is a schematic diagram of a RFO array and a reverse relative frequency ordering array.

Reverse RFO Array—this array has elements corresponding to the numeric label of each zone within the realm, typically 2000 zones/realm, where there may typically be 20 realms as illustrated in FIG. 2. This array differs from the Frequency Queue Array in the ordering criterion which is in the sequence of logical zone addresses (i.e., not write frequency), enabling a quick determination by the RFO algorithm of the frequency of a particular zone. Each element in this array represents a logical zone within a realm—two bytes may be allocated to store each zone address, potentially enabling the use of up to $2^{16}-1=65535$ zones. Array 500 in FIG. 5 is an example of a Reverse RFO array.

Frequency Neighborhood Array—this array is a sequence of pointers to the RFO array, indicating the boundaries of the frequency neighborhoods in the RFO array. Typically, there may be approximately 15 frequency neighborhood boundaries (defining 16 neighborhoods) within each realm, where there may typically be 20 realms as illustrated in FIG. 2. FIG. 4 illustrates how the frequency neighborhood array determines the neighborhood boundaries. Use of this array enables the boundaries of the frequency neighborhoods to be changed to maintain equal zone writes within each neighborhood. Each element within the frequency neighborhood array may be stored using two-bytes, to enable the use of up to $2^{16}-1=65535$ zones. Array 450 in FIG. 4 is an example of a Frequency Neighborhood Array.

Indirection System—for some embodiments of the present invention, a separate indirection system may operate within each realm, where there may typically be 20 realms as illustrated in FIG. 2. In some embodiments of the present invention, this array may have approximately 2000 elements, each corresponding to a writing zone and its mapping to a physical location (e.g., track and sector numbers, stored using typically four bytes) on the disk medium surface 124, as illustrated in FIG. 2.

Spare Zone Array—for some embodiments of the present invention, there may be a separate spare zone array for each realm, where there may typically be 20 realms as illustrated in FIG. 2. For operation of some embodiments of the present invention, there can be at least one spare zone per realm, and up to about four spare zones. The spare zone array stores the zone numbers of typically up to four spare zones within the realm, for use in moving zone writing locations to positions to reduce far track interference. Each element within the spare zone array may be stored using two-bytes, to enable the use of up to $2^{16}-1=65535$ zones.

Relative Frequency Ordering (RFO) Method

Figure 3:
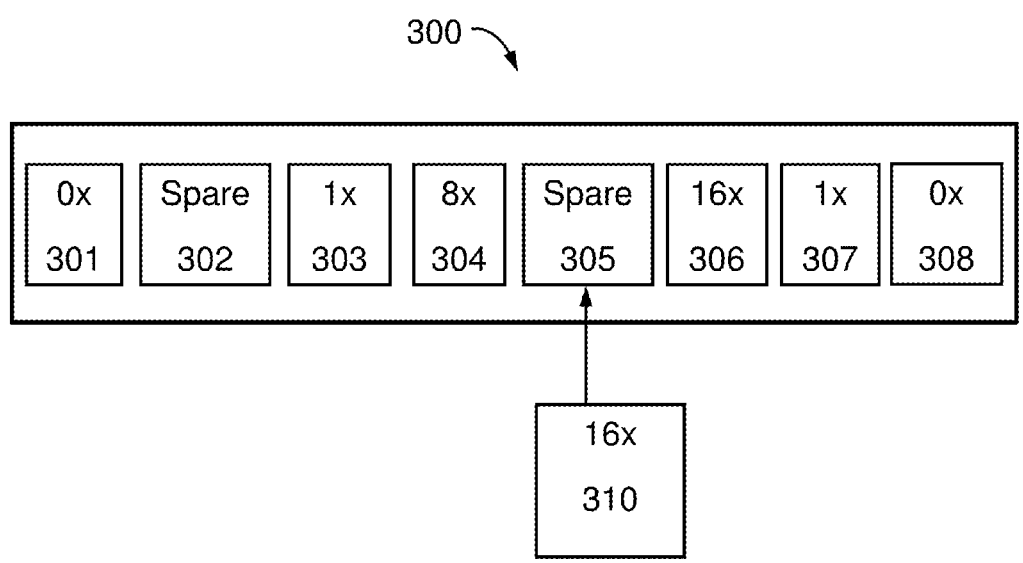
FIG. 3 is a schematic diagram of a portion of a realm containing neighboring physical regions with varying rewrite frequencies.

FIG. 3 is a schematic diagram 300 of a portion of a realm containing neighboring physical regions with varying rewrite frequencies. To reduce the required number of far track interference (FTI) rewrites, embodiments of the present invention move logical zones adjacent to other logical zones having similar write frequencies. As is known in the art, an FTI rewrite is required whenever data in a particular zone is exposed to a certain number of write events within nearby tracks (i.e., within approximately thirty tracks on each side). Due to stray magnetic field effects from typical write heads, the process of writing data into magnetic bits within a particular track may induce small changes in the magnetizations of data bits within neighboring tracks. These changes in data bit magnetization may be cumulative, so that after a certain number of nearby write events, the data in a track may need to be "refreshed", or rewritten. This process of rewriting the data is termed an "FTI rewrite" and represents overhead on the operation of the hard disk drive (HDD) since during this process, data cannot be written onto, or read from, the disk, and thus the average data transfer rate (i.e., bits/sec) to and from the HDD may be reduced. Within the RFO array, it is important that the ratio of adjacent write frequencies is substantially less than the FTI threshold to ensure that zones are rewritten frequently enough through the process of storing user data usually before the need for an FTI rewrite occurs.

Figure 11:
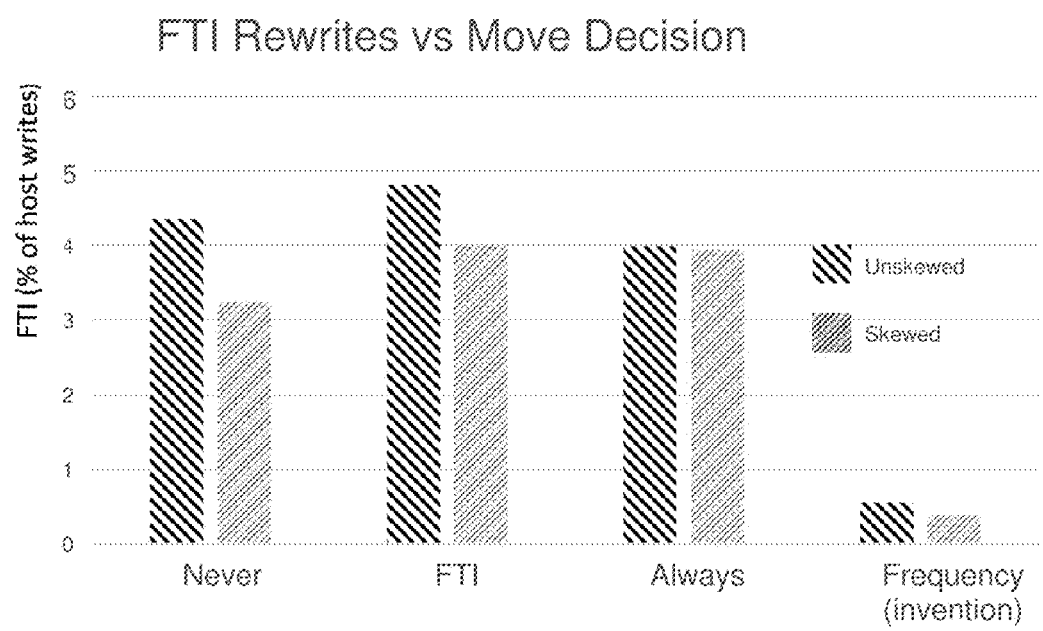
FIG. 11 is a graph of the percentage of FTI rewrites for various FTI mitigation algorithms.

Methods may be based on the realization that by physically grouping together zones with similar writing frequencies, the number of FTI rewrites may be reduced. Extensive computer modeling results of the RFO algorithms confirmed this expected reduction in necessary FTI rewrites as shown in FIG. 11. The reason for this reduction in the number of FTI rewrites is intuitive—for example if a neighborhood is "hot" with frequent data writing events for all of the zones within that neighborhood, none of the zones will need FTI rewrites because they are already being rewritten with non-FTI rewrite data storage writes. Conversely, in a "cold" neighborhood with infrequent writes for all zones, none of the zones are exposed to frequent neighboring write events and thus FTI effects are minimal. Only in situations where some zones are "hot" and are near "colder" zones will the need for frequent FTI rewrites arise, since the colder zones will be adversely affected by FTI from the hotter zones.

In FIG. 3, eight neighboring physical data storage locations 301-308 within a realm on the disk medium surface 124 are illustrated. Within each physical location the relative write frequencies are shown, ranging from 0× ("cold") to 16× ("hot"). These designations of "cold" and "hot" are relative, so for an active HDD, a write frequency termed "cold" might correspond to a "hot" write frequency on a more inactive HDD. For embodiments of the present invention, what is important is the relative frequencies between zones, not the absolute write frequencies (e.g., writes/hour). This distinction is intuitive since FTI events are cumulative, independent of the rate of writing into neighboring hotter zones. In FIG. 3, two spare zones are illustrated, spare zone 302 between neighboring colder zones 301 and 303, and spare zone 305 between neighboring hotter zones 304 and 306. Since the zone to be moved, zone 310, is relatively "hot" with a rewrite frequency of 16×, it can be moved to spare location 305 so its neighbors will have similar write rates, rather than moving zone 310 to zone 302 where it would be surrounded by much cooler zones and thus FTI effects from zone 302 would adversely affect zones 301 and 303. Note that after this move, zone 310 would become a new spare zone since the data in it has been moved to zone 305—this corresponds to the indirection system remapping the logical block address (LBA) previously mapped to zone 310 to now being mapped to zone 305.

FIG. 4 is a schematic diagram of an RFO array 400 and a frequency neighborhood array 450, and how they are logically connected in the method of embodiments of the present invention. In RFO array 400, minimum rewrite frequency zones are to the left, and maximum rewrite frequency zones are to the right, as indicated by the arrow. The zones have index numbers as shown, starting from the lowest frequency zone at the far left ("1"), and increasing to the right (to "13" and beyond). Typically, there may be as many as 2000 zones (N=2000) per realm in embodiments of the present invention. In FIG. 4, within the RFO array 400, each array location represents a physical zone, for example, the lowest frequency zone (with index "1") corresponds to logical block address #2, and the next higher frequency zone (with index "2") is LBA #9. These zones are grouped into a relatively small number of neighborhoods (i.e., roughly sixteen for a 10 TB HDD, and eight for a 1 TB HDD), such as neighborhoods 404 and 406 in FIG. 4. Within each neighborhood there is a small degree of variation in the relative write frequencies, and thus minimal FTI. The frequency neighborhood array (FNA) stores the indices of the zones at the boundaries of these neighborhoods—for example the first location (index "1") in the FNA at the far left contains zone number 4, corresponding to the first zone in the second neighborhood 404 in the RFO array, as indicated by the connecting arrow in FIG. 4. Similarly, the next element (index "2") in the FNA is 10, corresponding to the first zone in the third neighborhood 406, as indicated by the arrow. Thus in order to move the boundaries of the frequency neighborhoods when zones are swapped in the RFO array, all that is necessary is to change values within the FNA, as can be seen by comparison of FIG. 4 with FIG. 8.

FIG. 5 is a schematic diagram of an relative frequency ordering (RFO) array 400 and a reverse RFO array 500 and how their indices and array element values are correlated. The RFO array 400 at the top is the same is in FIG. 4, with zone indices in numerical order from "1" up to the number of zones, "N". The values of each element of the RFO array are the numbers of the logical zone corresponding to each particular index. The reverse RFO array 500 is at the bottom, also with numerical indices from "1" to the number of zones, "N". The values of each element of the reverse RFO array are the indices in the RFO array corresponding to the logical zone equal to the index value. This correspondence is illustrated by the arrows in FIG. 5. The value of the reverse RFO array is that it enables a quick determination of the location of a particular physical zone within the RFO array. For example, to determine the index (location) of logical zone 5 in the RFO array, you would look at index number 5 in the reverse RFO array, which has value 12, corresponding to the location in the RFO array where logical zone 5 is located, as shown by the arrows in FIG. 5.

Figure 6:
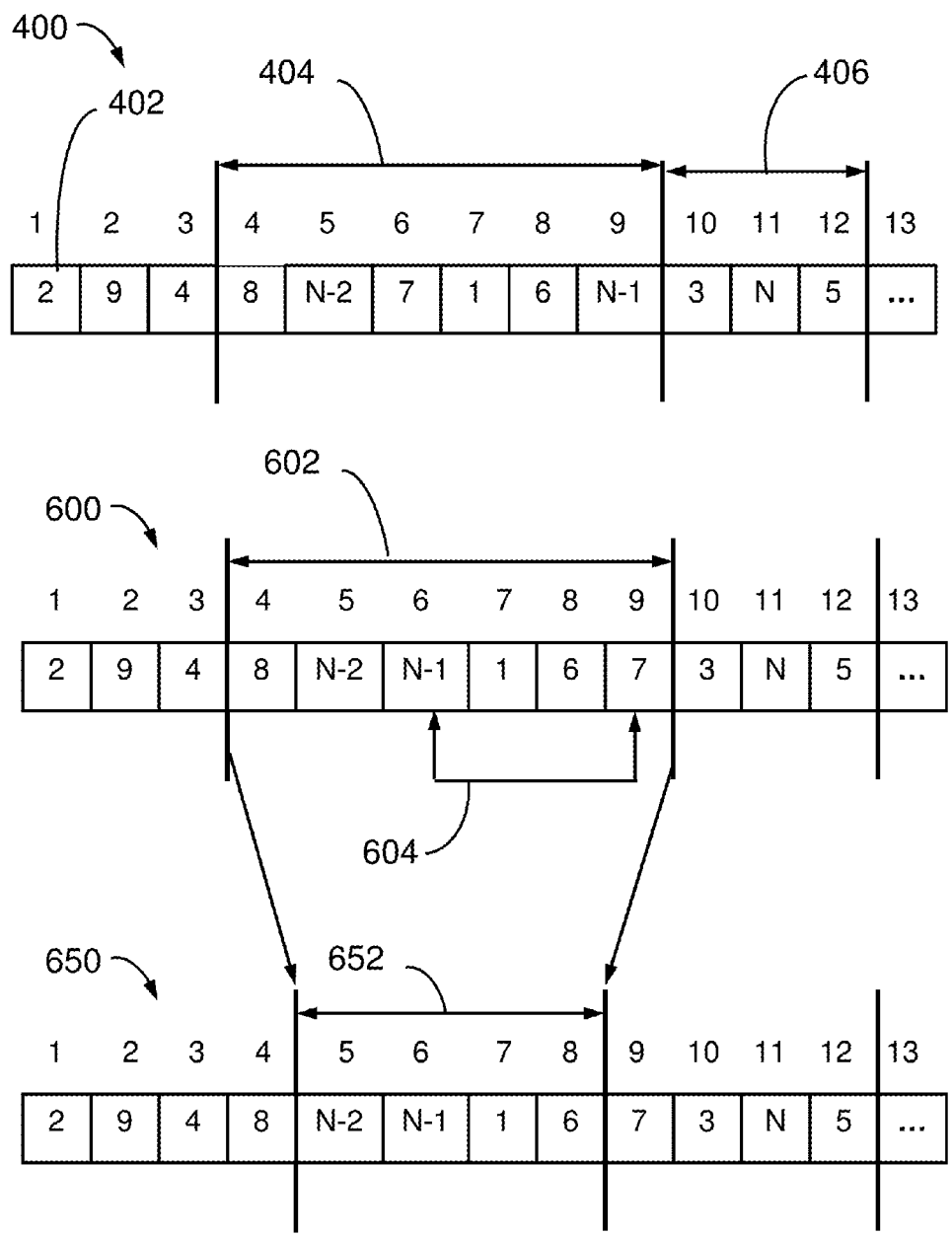
FIG. 6 is a schematic diagram of the process of writing a logical zone in terms of the RFO array.

FIG. 6 is a schematic diagram of the process of writing a logical zone in terms of the relative frequency ordering array. At the top, the original RFO array 400 from FIG. 4 is shown, including the boundaries for neighborhoods 404 and 406. At the middle, RFO array 600 represents the changed values in the RFO array 400 after swap 604 has been executed, wherein the contents of RFO array elements 6 and 9 are swapped. Element 6 was originally logical zone 7 and is now logical zone N−1, while element 9 was originally logical zone N−1 and is now logical zone 7. Neighborhood 602 still has the same boundaries in array 600 that neighborhood 404 had in array 400, however in order to maintain equal zone writes in the neighborhood, it can be moved to the neighborhood boundaries as shown by the arrows. RFO array 650 now has a smaller neighborhood 652 after this shift in boundaries.

Figure 7:
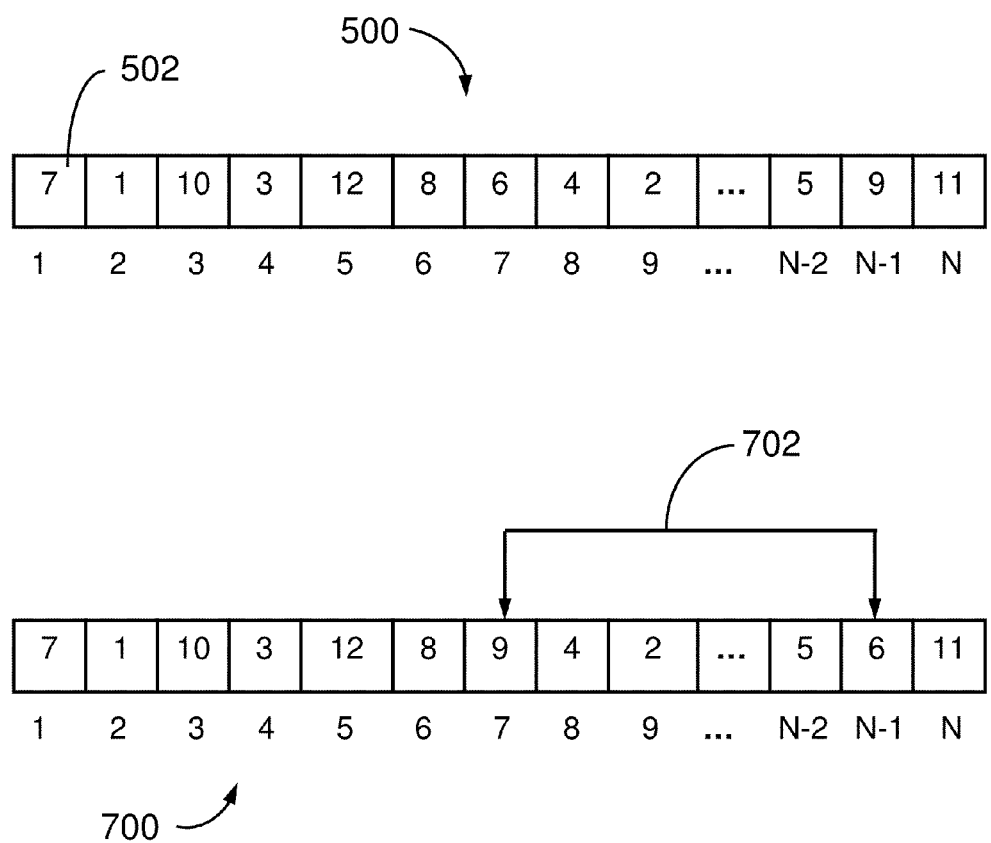
FIG. 7 is a schematic diagram of the process of writing a logical zone in terms of the reverse RFO array.

FIG. 7 is a schematic diagram of the process of writing a logical zone in terms of the reverse RFO array—this corresponds to FIG. 6 which illustrated this same process from the perspective of the RFO array. At the top, the original reverse RFO array 500 is shown from FIG. 5, corresponding to the original RFO array 400 from FIG. 4. At the bottom, the reverse RFO array 700 after swap 702 is shown—this corresponds to RFO array 600 in FIG. 6, while swap 702 corresponds to swap 604 in FIG. 6.

Figure 8:
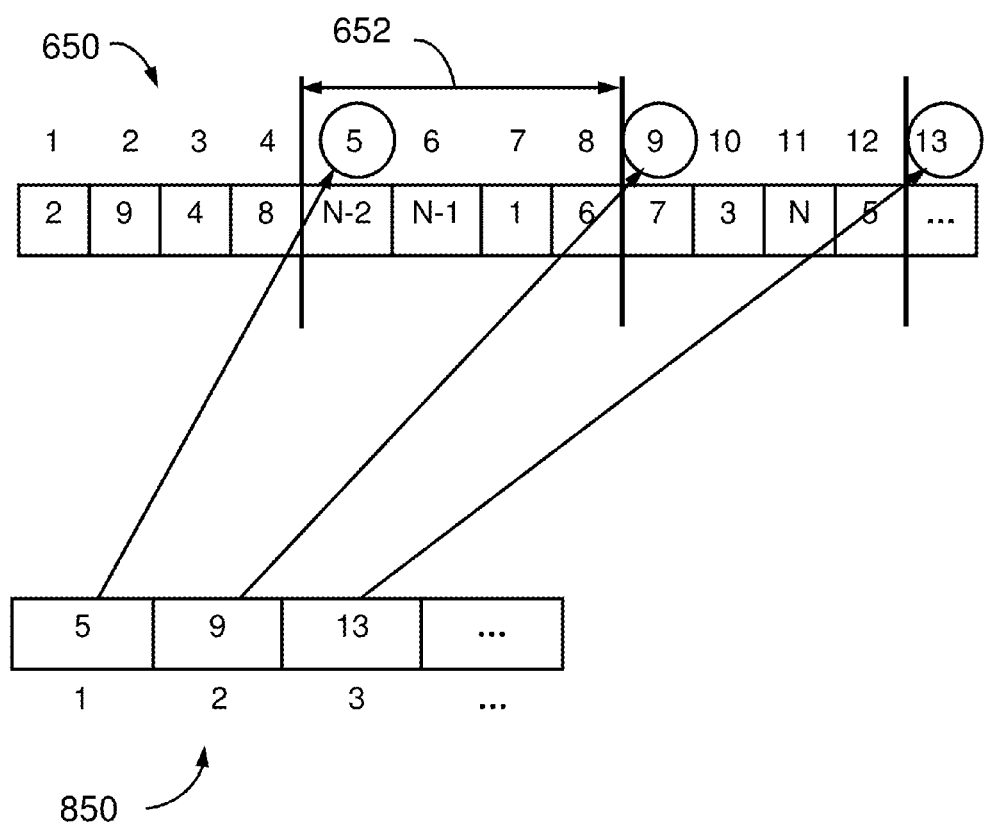
FIG. 8 is a schematic diagram of an RFO array and a frequency neighborhood array after writing a logical zone.

FIG. 8 is a schematic diagram of the RFO array 650 from FIG. 6 with the moved neighborhood boundaries, and the corresponding changes to the original frequency neighborhood array after writing a logical zone—this corresponds to the original frequency neighborhood array 450 in FIG. 4, except that the second and third values (with indices "2" and "3", respectively) in the frequency neighborhood array 850 have been changed in order to move the boundaries in the RFO array 650.

Figure 9:
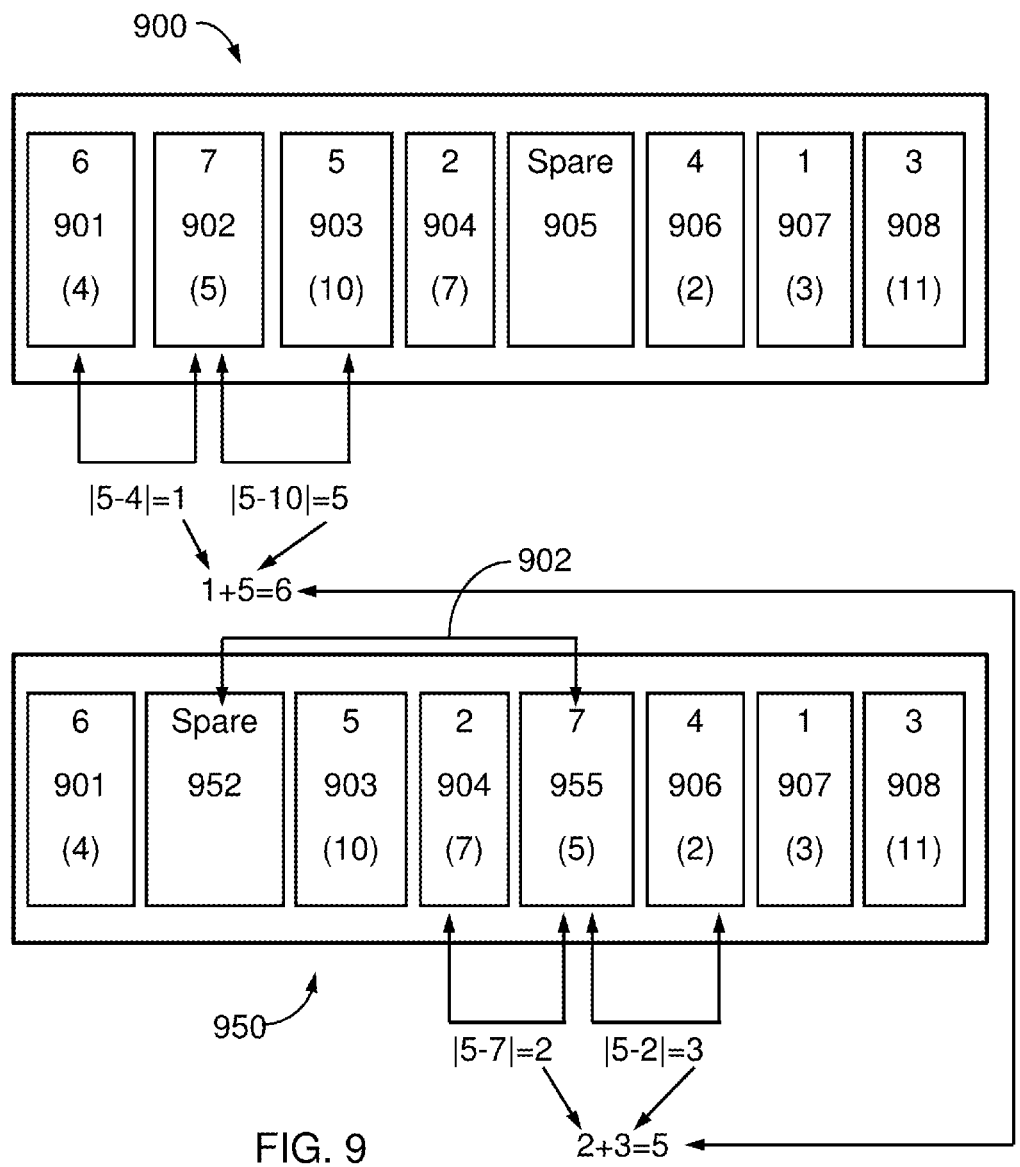
FIG. 9 is a schematic diagram showing use of the RFO array to move zone writes within a realm.

FIG. 9 is a schematic diagram 900 showing use of the RFO array to determine whether a logical zone should be moved or left in its original location. At the top, a group of eight neighboring physical regions within a realm is shown. Each box represents a physical region, radially located across the disk surface, from 901 to 908, where the zone number is shown at the top of each box, and the frequency neighborhood in which each zone is located shown in parentheses at the bottom of each box. Thus, for example, zone 6 is in frequency neighborhood 4, while zone 7 is in frequency neighborhood 5. The method of some embodiments of the present invention is to write the zone (in this example, zone 7) at a location which minimizes the absolute values of the differences in the neighborhoods of adjacent zones—by doing this, the writing rate differences between neighboring physical regions will be minimized, thereby reducing the need for FTI rewrites. In the arrangement of zones 900, these differences are shown as |5−4|=1 and |5−10|=5, giving a total of 6. However, if zone 7 were to be moved to the location shown by swap 902, then the two differences would be |5−7|=2 and |5−2|=3, adding up to 5. This indicates that it can be preferable to place zone 7 between zones 2 and 4, instead of between zones 6 and 5, i.e., swap 902 can be used.

Flowchart for the Relative Frequency Ordering (RFO) Algorithm

Figure 10:
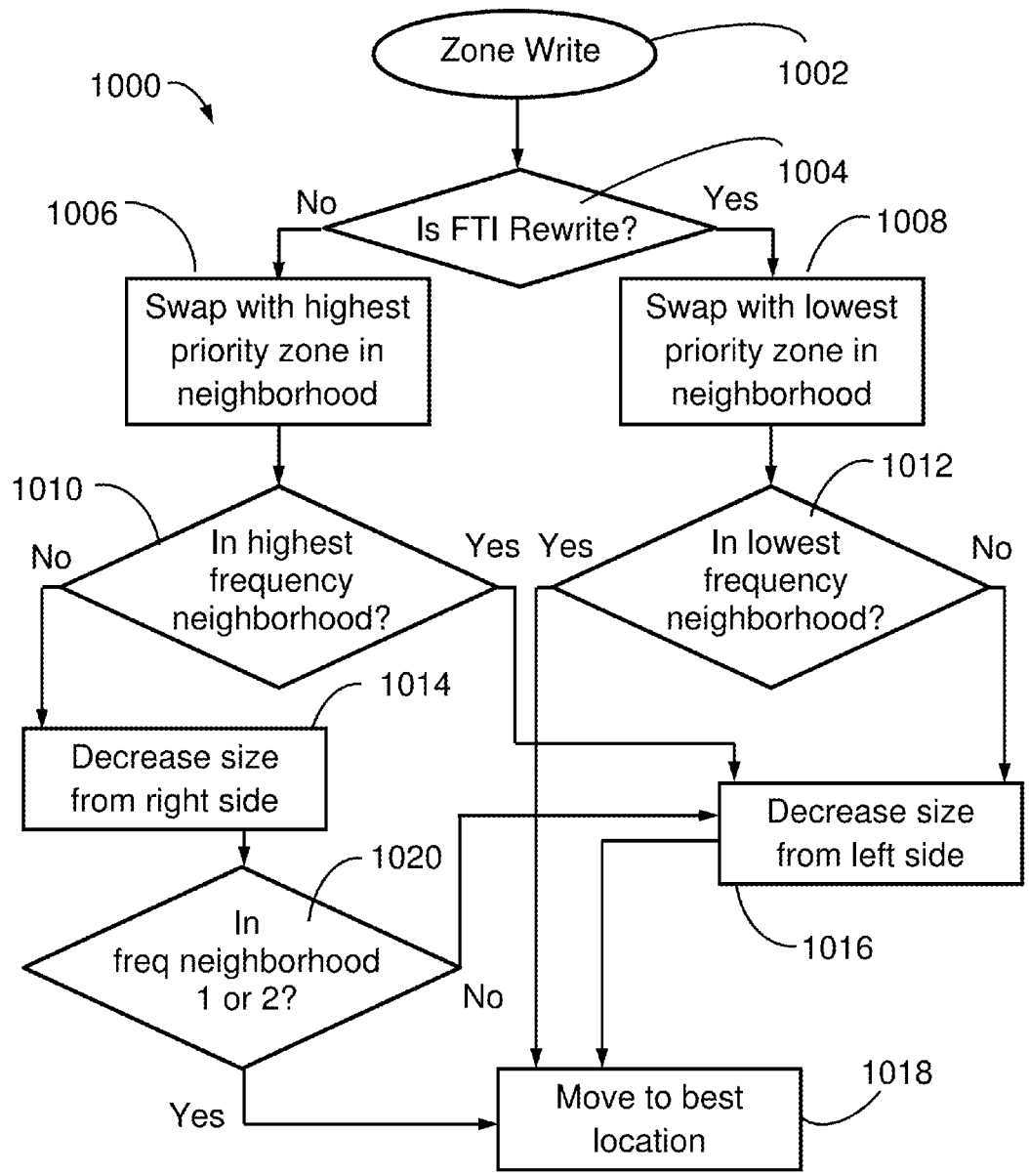
FIG. 10 is a flowchart of the RFO algorithm.

FIG. 10 is a flowchart 1000 of a relative frequency ordering (RFO) algorithm according to some embodiments of the invention. The algorithm starts with block 1002, the beginning of a zone writing process. In block 1004, a determination is made whether the zone write is to compensate for far track interference (FTI) effects or not. If it is not an FTI rewrite, block 1006 is entered; if it is an FTI rewrite, block 1008 is entered. In block 1006, the write location is swapped with the highest priority zone within the same frequency neighborhood. Block 1010 then determines if the zone writing is in the highest frequency neighborhood—if it is not, then it is possible to decrease the size of the neighborhood from the right side in block 1014. If the zone writing is in the highest frequency neighborhood, it is not possible to move the right side neighborhood boundary since it is at the upper end of the RFO array. Block 1020 then determines if the zone writing is in the lowest two frequency neighborhoods (#1 and 2)—if it is not, then it is possible to decrease the size of the neighborhood from the left side in block 1016. If the zone writing is in the lowest two frequency neighborhoods (#1 and 2) it is not possible or desirable to move the left side neighborhood boundary since it is at or near the lower end of the RFO array. Both logical paths, from blocks 1012 and 1016, end at block 1018 where the zone writing is moved to the best location. In this case, the "best" location is defined as either a spare region or the current region which follows the decision criterion illustrated in FIG. 9.

In block 1008, the write location is swapped with the lowest priority zone within the same frequency neighborhood. Block 1012 then determines if the zone writing is in the lowest frequency neighborhood—if it is not, then it is possible to decrease the size of the neighborhood from the left side in block 1016. If the zone writing is in the lowest frequency neighborhood, it is not possible to move the left side neighborhood boundary since it is at the lower end of the RFO array, so block 1018 is entered immediately.

FTI Rewrites as a Function of the Criteria for Move Decisions

FIG. 11 is a histogram 1100 illustrating the results of modeling of various criteria for deciding whether to move a zone within a realm. Results for both "Skewed" writing (i.e., nearer the ID, such as for realm 206 in FIG. 2) or for "Unskewed" writing (i.e., randomly located across the disk from the ID to the OD in FIG. 2) are shown—in general, the effects on the percentage of FTI writes compared to the number of host writes is minimal. Results for four FTI mitigation algorithms are shown:

Never—for this algorithm, logical zones are never moved, in spite of potentially large mismatches in writing frequencies with neighboring zones.

FTI—this algorithm corresponds to a commonly-used method in which the number of writes is counted and when a pre-determined FTI threshold is exceeded, the data is refreshed (rewritten).

Always—for this algorithm, the logical zone is always moved to a different physical region, independent of whether it has experienced significant FTI effects. Clearly this may result in unnecessary amounts of data rewriting.

Frequency—this corresponds to FTI mitigation methods according to some embodiments of the present invention. Histogram shows that with this method, far fewer FTI writes are required to maintain the same levels of data integrity, both for skewed and unskewed writing conditions. Since reducing the percentage of FTI writes compared with the total number of writes will reduce the overhead on the HDD and increase the average data transfer rate of the HDD, this is a better algorithm based on these simulation results.

Alternative Embodiments

Although embodiments have been described in the context of hard disk drives, it should be understood that various changes, substitutions and alterations can be made. Moreover, the scope of the present application is not intended to be limited to the particular embodiments of the process, machine, manufacture, or composition of matter, means, methods and steps described in the specification. As one of ordinary skill in the art will readily appreciate from the disclosure of embodiments, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for mitigating far field interference effects in a data storage system, comprising the steps of:
    configuring the data storage system with:
        a hard drive data storage device comprising a multiplicity of data storage surfaces, each comprising a multiplicity of realms, wherein each realm comprises a plurality of regions, and each region comprises a multiplicity of data tracks;
        a write head for storing data on tracks within the multiplicity of data tracks;
        a read head for reading data from the tracks written by the write head;
        storage for a relative frequency ordering (RFO) array;
    executing an algorithm for relative frequency ordering (RFO) comprising the steps of:
        initiating a zone writing process;
        determining if the writing process is an FTI rewrite;
            if the writing process is an FTI rewrite, swapping the zone to be written with the lowest priority zone in the neighborhood of the zone to be written in the RFO array; or
            if the writing process is not an FTI rewrite, swapping the zone to be written with the highest priority zone in the neighborhood of the zone to be written in the RFO array; and
        moving the zone to be written to a location determined by the application of a predetermined optimization criterion based on the ordering of elements in the RFO array updated in the previous step.

2. The method of claim 1, further comprising the steps of:
    before the moving the zone to be written step, if the writing process is an FTI rewrite and if the neighborhood of the zone to be written is not the lowest frequency neighborhood in the realm, then moving the left boundary of the neighborhood by one index element to the right.

3. The method of claim 1, further comprising the steps of:
    before the moving the zone to be written step, if the writing process is not an FTI rewrite and if the neighborhood of the zone to be written is the highest frequency neighborhood in the realm, then moving the left boundary of the neighborhood by one index element to the right.

4. The method of claim 3, further comprising the steps of:
before the moving the zone to be written step, if the writing process is not an FTI rewrite and if the neighborhood of the zone to be written is not the highest frequency neighborhood in the realm, then moving the right boundary of the neighborhood by one index element to the left.

5. The method of claim 4, further comprising the steps of:
before the moving the zone to be written step, if the writing process is not an FTI rewrite and if the zone to be written is not in either of the two lowest frequency neighborhoods, the moving the left boundary of the neighborhood by one index element to the right.

6. The method of claim 1, wherein the predetermined optimization criterion comprises the steps of:
determining the neighborhood indices of the two adjacent zones to the zone to be written;
calculating the absolute values of the differences between the neighborhood indices of the two adjacent zones to the zone to be written and the neighborhood index of the zone to be written and sum these two values to form a first sum;
determining the neighborhood indices of the two adjacent zones to a spare zone in the neighborhood of the zone to be written;
calculating the absolute values of the differences between the neighborhood indices of the two adjacent zones of the spare zone and the neighborhood index of the zone to be written and sum these two values to form a second sum; and
comparing the first sum and the second sum, and if the first sum is larger than the second sum, then move the zone to be written to the spare location in the neighborhood of the zone to be written.

7. The method of claim 1, wherein the elements of the RFO array correspond to the numeric label of each zone within the realm, representing a logical zone, and the indices of the elements of the RFO array correspond to ordering from a minimum write frequency to a maximum write frequency.

8. The method of claim 1, further comprising storage for a reverse RFO array, wherein the elements of the reverse RFO array correspond to the indices of the elements in the RFO array, and the indices of the reverse RFO array correspond to the numeric labels of each zone within the realm.

9. The method of claim 1, further comprising storage for a frequency neighborhood (FN) array, wherein each element in the FN array is a pointer to the RFO array indicating the boundaries of neighborhoods in the RFO array.

10. A method for mitigating far field interference effects in a data storage system, comprising the steps of:
configuring the data storage system with:
a hard drive data storage device comprising a multiplicity of data storage surfaces, each comprising a multiplicity of realms, wherein each realm comprises a plurality of regions, and each region comprises a multiplicity of data tracks;
a write head for storing data on tracks within the multiplicity of data tracks;
a read head for reading data from the tracks written by the write head;
storage for a relative frequency ordering (RFO) array;
executing an algorithm for relative frequency ordering (RFO) comprising the steps of:
initiating a zone writing process;
determining if the writing process is an FTI rewrite;
if the writing process is an FTI rewrite, swapping the zone to be written with the lowest priority zone in the neighborhood of the zone to be written in the RFO array, and if the neighborhood of the zone to be written is not the lowest frequency neighborhood in the realm, then moving the left boundary of the neighborhood by one index element to the right; or
if the writing process is not an FTI rewrite, swapping the zone to be written with the highest priority zone in the neighborhood of the zone to be written in the RFO array, and if the neighborhood of the zone to be written is the highest frequency neighborhood in the realm, then moving the left boundary of the neighborhood by one index element to the right; and
moving the zone to be written to a location determined by the application of an optimization procedure comprising the steps of:
determining the neighborhood indices of the two adjacent zones to the zone to be written;
calculating the absolute values of the differences between the neighborhood indices of the two adjacent zones to the zone to be written and the neighborhood index of the zone to be written and sum these two values to form a first sum;
determining the neighborhood indices of the two adjacent zones to a spare zone in the neighborhood of the zone to be written;
calculating the absolute values of the differences between the neighborhood indices of the two adjacent zones of the spare zone and the neighborhood index of the zone to be written and sum these two values to form a second sum; and
comparing the first sum and the second sum, and if the first sum is larger than the second sum, then move the zone to be written to the spare location in the neighborhood of the zone to be written.

11. The method of claim 10, further comprising the steps of:
before the moving the zone to be written step, if the writing process is not an FTI rewrite and if the neighborhood of the zone to be written is not the highest frequency neighborhood in the realm, then moving the right boundary of the neighborhood by one index element to the left.

12. The method of claim 11, further comprising the steps of:
before the moving the zone to be written step, if the writing process is not an FTI rewrite and if the zone to be written is not in either of the two lowest frequency neighborhoods, the moving the left boundary of the neighborhood by one index element to the right.

* * * * *